United States Patent
Fuenfgeld et al.

(10) Patent No.: US 9,562,571 B2
(45) Date of Patent: Feb. 7, 2017

(54) DOUBLE CLUTCH

(71) Applicant: Schaeffler Technologies AG & Co. KG, Herzogenaurach (DE)

(72) Inventors: Simon Sebastian Fuenfgeld, Karlsruhe (DE); Patrick Weydmann, Buehl (DE); Gerhard Gander, Buehlertal (DE); Alexander Obitz, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/419,128

(22) PCT Filed: Jul. 16, 2013

(86) PCT No.: PCT/DE2013/200053
§ 371 (c)(1),
(2) Date: Feb. 2, 2015

(87) PCT Pub. No.: WO2014/019577
PCT Pub. Date: Feb. 6, 2014

(65) Prior Publication Data
US 2015/0204388 A1   Jul. 23, 2015

(30) Foreign Application Priority Data
Aug. 3, 2012 (DE) .................. 10 2012 213 805

(51) Int. Cl.
*F16D 13/58* (2006.01)
*F16D 13/40* (2006.01)
(Continued)

(52) U.S. Cl.
CPC ........... *F16D 13/585* (2013.01); *F16D 13/385* (2013.01); *F16D 13/40* (2013.01); *F16D 13/46* (2013.01); *F16D 21/02* (2013.01)

(58) Field of Classification Search
CPC .............................. F16D 13/585; F16D 13/385
See application file for complete search history.

(56) References Cited

U.S. PATENT DOCUMENTS 5,927,459 A   7/1999  Kajitani et al.
6,634,477 B2 * 10/2003  Beneton .................. F16D 21/06
                                                             192/111.16
(Continued)

FOREIGN PATENT DOCUMENTS

AU        75879/74        6/1976
DE        3433644    *    3/1986
(Continued)

*Primary Examiner* — Mark Manley
(74) *Attorney, Agent, or Firm* — Simpson & Simpson, PLLC

(57) ABSTRACT

Double clutch for coupling a drive shaft of a motor to a transmission shaft of a transmission in a vehicle having a first friction clutch for frictionally clamping a first clutch disc couplable to the transmission shaft between a first pressure plate and a first counter-plate, the first pressure plate displaceable in an axial direction to close the first friction clutch, a second friction clutch for frictionally clamping a second clutch disc couplable to an accessory power take-off between a second pressure plate and a second counter-plate, the second pressure plate displaceable in the axial direction to close the second friction clutch, a first actuating element configured to displace the first pressure plate, and, a second actuating element configured to engage a pressure ring connected to the second pressure plate to displace the second pressure plate, wherein the second actuating element is pre-loaded by at least one wire load ring.

11 Claims, 6 Drawing Sheets

(51) Int. Cl.
    *F16D 13/46*     (2006.01)
    *F16D 13/38*     (2006.01)
    *F16D 21/02*     (2006.01)

(56) References Cited

U.S. PATENT DOCUMENTS

| | | | |
|---|---|---|---|
| RE38,389 E | | 1/2004 | Fukuda |
| 2004/0069588 A1* | | 4/2004 | Pahrisch ............... F16D 13/583 |
| | | | 192/89.23 |

FOREIGN PATENT DOCUMENTS

| | | | |
|---|---|---|---|
| EP | 0235882 | | 9/1987 |
| EP | 1388679 | | 2/2004 |
| EP | 1413795 | | 4/2004 |
| FR | 2642485 | | 1/1990 |
| FR | 2807127 | | 10/2001 |
| FR | 2859773 | | 3/2005 |
| FR | WO2005/038280 | * | 4/2005 |
| GB | 2136064 | | 9/1984 |

\* cited by examiner

DOUBLE CLUTCH

CROSS-REFERENCE TO RELATED APPLICATIONS

The present application is the U.S. national stage application pursuant to 35 U.S.C. §371 of International Application No. PCT/DE2013/200053, filed on Jul. 16, 2013, which application claims priority from German Patent Application No. DE 10 2012 213 805.6, filed on Aug. 3, 2012, which applications are incorporated herein by reference in their entireties.

TECHNICAL FIELD

The present invention relates generally to double clutches in a motor vehicle.

BACKGROUND

The invention relates to a double clutch for coupling a drive shaft of a vehicle motor to a transmission shaft of a motor vehicle transmission and/or an accessory drive of the motor vehicle. Such clutch assemblies are used in tractors or other agricultural machines, for example. A first friction clutch is used for the driving operation and a second friction clutch is used for independently connecting and disconnecting an additional power take-off to drive additional units. The second friction clutch is usually open in a disengaged state, for example when the vehicle motor is started, and may take the required power directly off the drive shaft when it is engaged. As the second friction clutch is operated independently, the accessory drive may be used while the vehicle is at a standstill or while the vehicle is being driven. The second friction clutch may be used to drive mowing machines and other accessory agricultural equipment such as mechanical or hydraulic winches, hydraulic pumps, or compressors, which are much more powerful than electrical devices and do not affect the on-board electrical system of the motor vehicle. However, in such double clutches, the pressing force and the engaging forces are usually highly tolerance-dependent and in an engagement process, the actuating system of the second friction clutch of the double clutch in particular is loaded in a tension-critical way.

SUMMARY OF THE INVENTION

According to aspects illustrated herein, there is provided a double clutch for coupling a drive shaft of a vehicle motor to a transmission shaft of a vehicle transmission and/or to an accessory power-take-off of the motor vehicle, in particular to a power take-off shaft, having a first friction clutch for frictionally clamping a first clutch disc couplable to the transmission shaft between a first pressure plate and a first counter-plate, the first pressure plate displaceable in an axial direction to close the first friction clutch, a second friction clutch for frictionally clamping a second clutch disc couplable to the accessory power take-off between a second pressure plate and a second counter-plate, the second pressure plate displaceable in the axial direction to close the second friction clutch, a first actuating element configured to displace the first pressure plate, and, a second actuating element configured to engage a pressure ring connected to the second pressure plate to displace the second pressure plate, wherein the second actuating element is pre-loaded by at least one wire load ring.

According to aspects illustrated herein, there is provided a drive train for a motor vehicle, having a motor with a drive shaft, a transmission having a transmission shaft, and, a double clutch coupling the drive shaft to the transmission shaft and/or to an accessory power-take-off of the motor vehicle, the double clutch comprising, a first friction clutch for frictionally clamping a first clutch disc couplable to the transmission shaft between a first pressure plate and a first counter-plate, the first pressure plate displaceable in an axial direction to close the first friction clutch, a second friction clutch for frictionally clamping a second clutch disc couplable to the accessory power take-off between a second pressure plate and a second counter-plate, the second pressure plate displaceable in the axial direction to close the second friction clutch, a first actuating element configured to displace the first pressure plate, and, a second actuating element configured to engage a pressure ring connected to the second pressure plate to displace the second pressure plate, wherein the second actuating element is pre-loaded by at least one wire load ring.

An object of the invention is to provide a double clutch that allows the tolerance-dependence of the pressing force and/or engaging force as well as the tensions occurring in the actuating system to be reduced.

In accordance with the invention, a double clutch for coupling a drive shaft of a vehicle motor to a transmission shaft of a motor vehicle transmission and/or to an accessory power take-off of the motor vehicle, in particular to a power take-off shaft, including a first friction clutch for clamping in a frictionally clamping a first clutch disc couplable to the transmission shaft between a first pressure plate and a first counter-plate, the first pressure plate displaceable in an axial direction to close the first friction clutch, a second friction clutch for frictionally clamping a second clutch disc couplable to an accessory power take-off between a second pressure plate and a second counter-plate, the second pressure plate displaceable in an axial direction to close the second friction clutch, a first actuating element for displacing the first pressure plate, a second actuating element for displacing the second pressure plate connected to a pressure ring that is in effective connection with the second actuating element for the transmission of the displacing movement. In accordance with the invention, the second actuating element is pre-loaded by at least one wire load ring.

A meshed connection may be provided, for example with meshing gear teeth or splines, to couple the first clutch disc to the transmission shaft so that the first clutch disc is fixed against rotation relative to the transmission shaft but axially movable and a further meshed connection may be provided to couple the second clutch disc to the accessory power take-off so that the second clutch disc is fixed against rotation relative to the auxiliary power take-off but axially movable. The respective clutch disc of the associated friction clutch may have a respective friction lining, in particular at axial end faces facing away from each other. The friction lining may be brought into frictional contact with a potential friction lining of the associated counter-plate and/or pressure plate to close the respective friction clutch. The double clutch, in particular the first friction clutch of the double clutch, may include a vibration damper. The vibration damper may, for example, be a dual-mass flywheel and/or a centrifugal pendulum and/or a mass pendulum, which may be arranged on the first clutch disc, for example. The double clutch may include a first friction clutch in the form of an independently operatable sheet-steel cover single clutch for establishing a transmission of power between the vehicle motor, in particular the drive shaft of the vehicle motor, and the transmission shaft for driving the motor vehicle. The second friction clutch may be an accessory power take-off clutch provided in the form of a substructure arranged on the first friction clutch, for example between the first friction clutch and a flywheel of the vehicle motor. The accessory power take-off clutch, for example a power take-off shaft of a tractor, may be embodied as a safety power take-off shaft clutch, which will open immediately when a malfunction occurs at the engagement mechanism, in particular at the second actuating element, and the decoupled accessory power take-off may come to a standstill. The accessory power take-off may be embodied as a directly driven motor power take-off shaft, which is directly connectible to the vehicle motor via the second friction clutch and may thus be operated at the speed of the vehicle motor independently of whether the motor vehicle is in motion or not. Accessory power take-off clutches may also be referred to by the acronym PTO, and an accessory safety power take-off clutch or a safety clutch may be referred to as a safety PTO.

The first friction clutch can be actuated by an at least partial axial displacement of the first actuating element, causing the first pressure plate to be displaced in an axial direction towards the first counter-plate. In the process, the first clutch disc is frictionally clamped between the first pressure plate and the first counter-plate, allowing the transmission of power between the vehicle motor and the transmission shaft to drive the motor vehicle. The first actuating element may, for example, be embodied as a first lever spring that can be actuated independently of a second actuating element. Independently of the first friction clutch, the second friction clutch can be engaged by means of the second actuating element and a pressure ring to attain a transmission of power between the vehicle motor and the accessory power take-off such as a power take-off shaft. The pressure ring may be cup-like or cup-shaped and may surround the first friction clutch, which may be arranged inside a clutch cover, on the outside, and the clutch cover may at least partially be surrounded by the pressure ring. The pressure ring is connected to the second pressure plate of the second friction clutch. The second friction clutch may be open in a non-actuated state. An engagement of the pressure ring and thus of the second pressure plate occurs by actuating the second actuating element, which may be arranged on an end face of the clutch cover of the first friction clutch on a side facing away from the first and second pressure plates. The second actuating element may be supported to be movable by means of bolts fixed to the clutch cover of the first friction clutch and by means of a wire support ring arranged on the bolts. The wire support ring may be tensioned about the bolts radially on the outside, with the second actuating element in the form of a lever spring contacting the wire support ring and/or the bolts in such a way that the lever spring, in particular upon actuation of the second actuating element, is supported to tilt on the wire support ring and/or on the bolts.

The at least one wire load ring may be removably connected to the second actuating element. The wire load ring may be arranged radially to the inside of the wire support ring. Several wire load rings may be arranged to be concentric and/or axially adjacent to each other. The second actuating element may be held in an elastically deformed, pre-loaded state by the wire load ring fixed thereto. The elastic deformation of the second actuating element resulting from the mounting of the wire load ring causes the second actuating element to be pre-loaded in an axial direction, in particular in an axial direction away from the second pressure plate. An engaging force that may act on the second actuating element radially on the inside to actuate the second friction clutch may cause the engaging force transmitted to the pressure ring to be translated due to the spaced-apart bearing and/or contacting of the second actuating element on the wire support ring and the pressure ring.

When it is being engaged as a result of an engaging force, the second actuating element initially has a high rigidity until the engaging force exceeds the pre-load of the second actuating element. As the pre-load of the pre-loaded second actuating element is exceeded, the second actuating element may continue to be elastically deformed counter to its pre-load. The pressing force of the second friction clutch transmitted to the second pressure plate by the pressure ring after the pre-load has been overcome may progress on a flat characteristic line. Due to the pre-loaded second actuating element, the second actuating element may incorporate two rigidities of different magnitude. Thus in accordance with the selected rigidities, the pressing force may have two regions whose characteristic lines have different gradients, for example in the shape of an angled characteristic line with a steeper essentially linear gradient of the pressing force in the first section and a flatter essentially linear second section. Consequently, in the second region, the characteristic line of the pressing force of the second pressure plate may be ensured to have a smaller gradient across the engagement travel relevant during operation both when it is new and when there is wear on the second friction clutch. Thus the pressing force may be prevented from decreasing in the case of wear and the tolerance-dependence of the pressing force and/or of the engaging force may be reduced. The incorporation of two rigidities in the pre-loaded second actuating element may combine an initially high rigidity during an engagement process and a lower rigidity in the engaged condition without requiring much installation space, reducing tension in the actuating system upon an actuation of the second friction clutch.

In an example embodiment, the second actuating element is a lever spring with lever spring tabs that extend in a radially inward direction and the wire load ring is arranged on the lever spring tabs. The wire load ring may be arranged radially on the inside of the wire support ring, preferably radially to the inside of the contact regions between of the second actuating element and the pressure ring. The wire load ring may essentially be arranged centrally on the lever spring tabs extending in a radially inward direction and may contact the lever spring tabs. In a disassembled state, the lever spring tabs may rise in an axial direction, in particular in a direction away from the second pressure plate. Assembly of the wire load ring may cause the lever spring tabs to be elastically deformed in an axial direction, for instance towards the second pressure plate, and to be held in this position by the wire tension ring. In this way, the wire load ring may generate an axial pre-load in the lever spring, in particular in the lever spring tabs. The engaging force may act radially inwardly on the free ends of the lever spring tabs. In an engagement process initiated by the engaging force, the lever spring tabs may initially be deformed in a radially inward region in the region of the free lever spring ends for as long as the engaging force is lower than the pre-loading force. When the pre-loading force is exceeded, the entire lever spring tabs may be elastically deformed and deflected. During the engagement process, the lever spring tabs may act on the pressure ring with the transmitted engaging force. Once the pre-loading force has been exceeded, the pressing force may have a flatter characteristic line than at the beginning of the engagement process. Due to the pre-loaded lever spring tabs, two different rigidities may be incorporated in the lever spring. This may keep the decrease of the pressing force in the wear region and the tolerance-dependence of the pressing and engaging force on a low level.

In an example embodiment, the lever spring has supporting tabs to support the wire load ring. At least two supporting tabs may be provided to support the wire load ring. The wire load ring may be arranged on and/or fixed to the supporting tabs, allowing a defined attachment for example without interfering with the lever spring tabs.

In an example embodiment, the lever spring tabs and the supporting tabs are arranged in an alternating way. The alternating arrangement of lever spring tabs and supporting tabs, with the wire load ring potentially attached to the supporting tabs, may allow an improved support of the lever spring tabs on the wire load ring because the wire load ring may be fixed on each side of a lever spring tab.

In an example embodiment, the supporting tabs have attachment means for attaching the wire load ring to the supporting tabs. The wire load ring may be supported on the supporting tabs in a form-locking way. The wire load ring may preferably be arranged and tensioned radially to the outside around the attachment elements. The attachment elements may be an integral part of the respective supporting tab, for example in the form of sheet-metal lugs formed thereon. In an example embodiment, the attachment elements are formed as rivets arranged in the supporting tabs.

In a radially inward direction, the supporting tabs are preferably shorter than the lever spring tabs. Thus any unintentional contact upon a radially inward actuation and thus upon a displacement of the lever spring tabs may be avoided.

In an example embodiment, the supporting tabs are at least partially profiled. The profile may extend at least along a part of the supporting tab, in particular in the radial direction. The supporting tabs may have identical and/or different profiles. The profile of the supporting tabs may increase the area moment of inertia of the supporting tabs, resulting in an even further increase of rigidity of the supporting tabs.

In an example embodiment, the profile is shaped like a bead. The bead for increasing the rigidity of the supporting tab, in particular against deformation in an axial direction, may extend along a section of the supporting tab or across its entire length. The bead may preferably extend radially from the outside to the attachment element. The bead may be produced in a cost-efficient way by deforming the supporting tab, in particular by an embossment.

The invention further relates to a drive train for a motor vehicle comprising at least one double clutch that may be embodied and further developed in the way described above to couple a drive shaft of a vehicle motor to a transmission shaft of a motor vehicle transmission and/or to an accessory power take-off of the motor vehicle. This may avoid a decreasing of the pressing force in the case of wear and may reduce the tolerance-dependence of the pressing and/or actuating force.

These and other objects, advantages and features of the present invention will be better appreciated by those having ordinary skill in the art in view of the following detailed description of the invention in view of the drawings.

BRIEF DESCRIPTION OF THE DRAWINGS

The present invention will be explained by way of example below based on preferred exemplary embodiments and with reference to the accompanying figures, in which.

DETAILED DESCRIPTION OF THE INVENTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

By "non-rotatably connected" first and second components we mean that the first component is connected to the second component so that any time the first component rotates, the second component rotates with the first component, and any time the second component rotates, the first component rotates with the second component. Axial displacement between the first and second components is possible.

Figure 1:
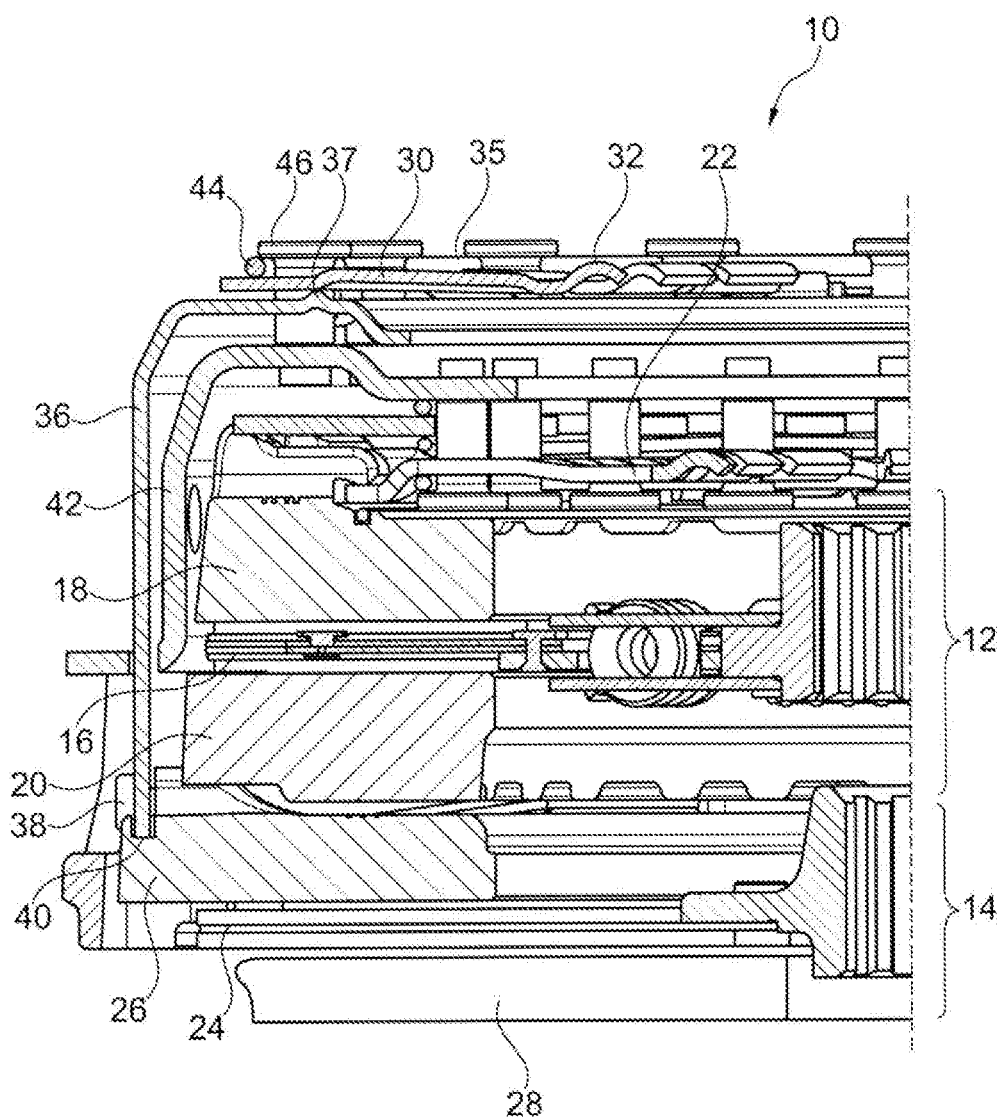
FIG. 1 is a first diagrammatic cross-sectional view of a double clutch according to the present invention.

FIG. 1 illustrates double clutch 10 including first friction clutch 12 and second friction clutch 14. First friction clutch 12 and second friction clutch 14 are shown in a disengaged, non-actuated condition. First friction clutch 12 is a sheet-steel cover single clutch including first clutch disc 16 for being frictionally clamped between first pressure plate 18 and first counter-plate 20. First pressure plate 18 is movable in an axial direction by actuating an actuating element 22, which is in the shape of a first lever spring. Second friction clutch 14 is embodied as an accessory power-take-off safety clutch with second clutch disc 24 for being clamped between second pressure plate 26 and second counter-plate 28 and is arranged underneath first friction clutch 12. Upon actuation of second actuating element 30, second pressure plate 26 is movable in an axial direction independently of first friction clutch 12. The second friction clutch is illustrated in a non-actuated, open condition.

Second actuating element 30 is embodied as a second lever spring with lever spring tabs 32 extending in a radially inward direction. Second actuating element 30 is pre-loaded in an axial direction via wire tension ring 34 attached to lever spring tabs 32 by means of attachment elements 35. Upon actuation of the pre-loaded second actuating element 30 in the form of the second lever spring, the transmission of an engaging movement to second pressure plate 26 occurs via pressure ring 36, which is connected to second pressure plate 26. Screw connection 38 is provided to secure pressure ring 36 in a radial direction against coming off second pressure plate 26 in the radial direction. Pressure ring 36 is received in groove 40 in second pressure plate 26. Groove 40 is formed radially on the outside of second pressure plate 26 in a surface facing away from second clutch disc 24.

Pressure ring 36 surrounds first friction clutch 12 essentially on the outside and at least partially passes through clutch cover 42 of first friction clutch 12, thus ensuring that pressure ring 36 is guided by clutch cover 42 of first friction clutch 12. On an end face facing second actuating element 30, the cup-like or cup-shaped pressure ring 36 has annular bulge 37 that contacts the pre-loaded second actuating element 30. Bulge 37 contacts second actuating element 30 radially on the inside. Radially to the outside of the location of contact with bulge 37, second actuating element 30 is supported to tilt on wire support ring 44. Wire support ring 44 is arranged radially on the outside about multiple bolts 46 that are connected to clutch cover 42 of first friction clutch 12. The distance between wire support ring 44 and bulge 37 as well as the radially inward location of the point of introduction of the engaging force may allow a transmission of the engaging force acting on pressure ring 36.

Figure 2:
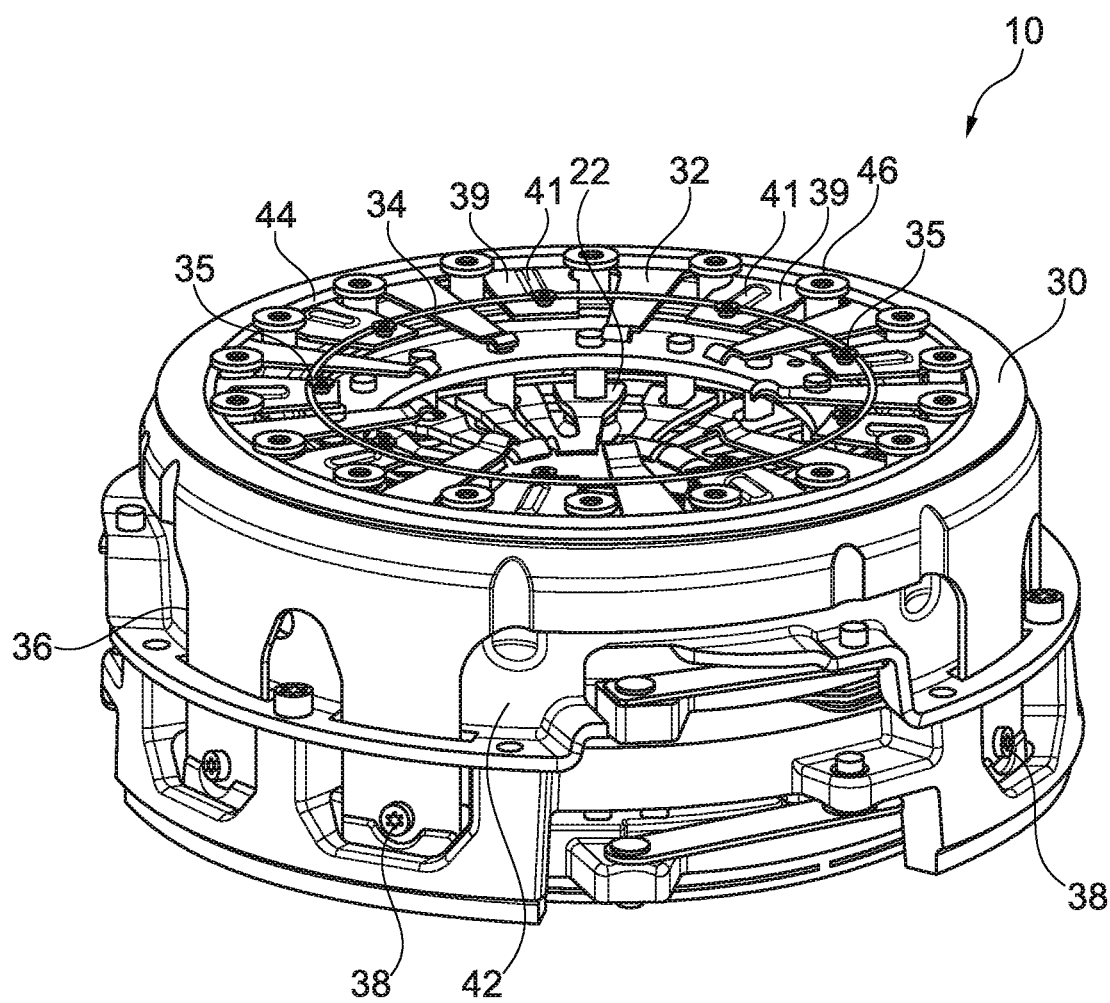
FIG. 2 is a perspective view of a double clutch of the present invention.

FIG. 2 illustrates double clutch 10 in an assembled condition. Lever spring tabs 32 and the supporting tabs 39 of the pre-loaded second actuating element 30 are shown in a non-actuated condition. In a radially inward direction, lever spring tabs 32 are longer than supporting tabs 39 to which wire load ring 34 is fixed by means of attachment elements 35 in the form of retaining bolts. Lever spring tabs 32 and supporting tabs 39 are arranged in an alternating way and radially to the outside; supporting tabs 39 have a greater width than lever spring tabs 32. Radially on the outside, second actuating element 30 is in contact with pressure ring 36. In multiple locations, pressure ring 36 extends through clutch cover 42 of first friction clutch 12 and is releasably connected to second pressure plate 26 (shown in FIG. 1) of second friction clutch 14 by screw connections 38.

Figure 3A:
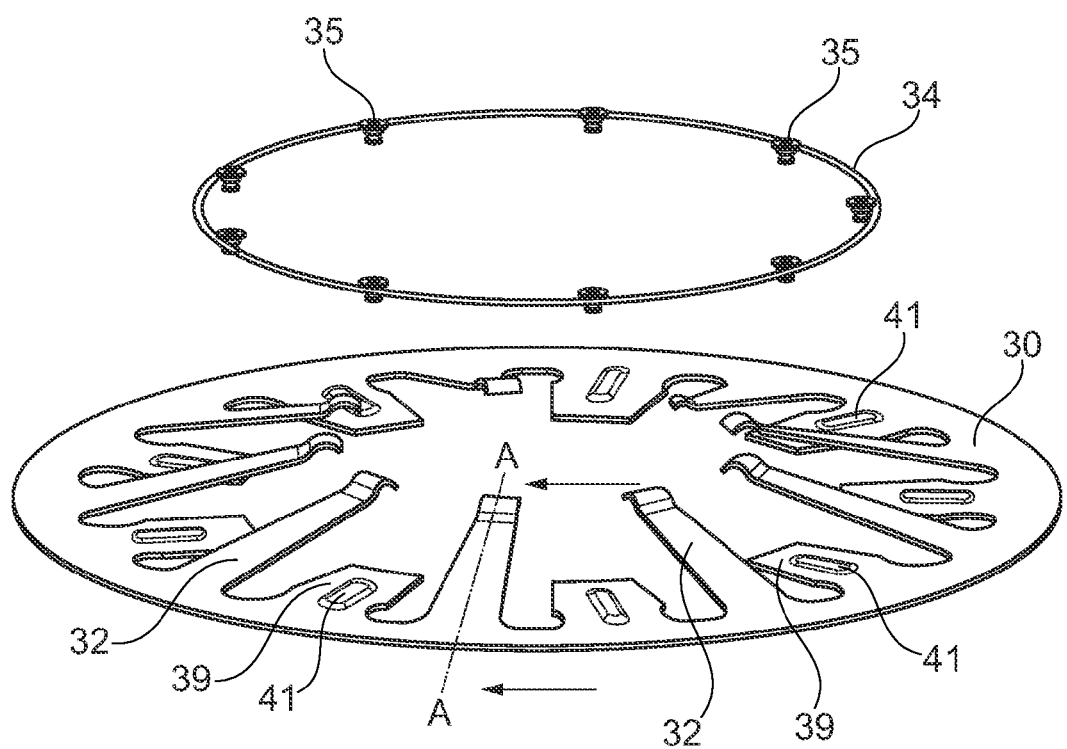
FIG. 3a is an exploded view of a second actuating element including a wire load ring.
Figure 3B:
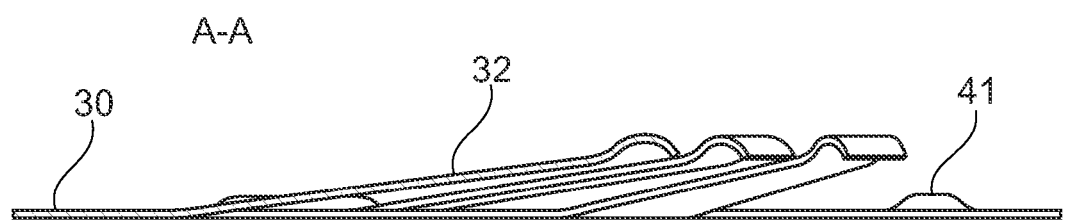
FIG. 3b is a cross-sectional view of a disassembled second actuating element.

FIG. 3a shows second actuating element 30 in a disassembled condition in the form of a lever spring and wire load ring 34 that is spaced apart from the lever spring and has attachment elements 35. Radially on the inside, second actuating element 30 has nine lever spring tabs 32 and nine supporting tabs 39. To increase their rigidity and resistance to an axial displacement of supporting tabs 39, each of supporting tabs 39 has a respective profile 41. Profile 41 of supporting tabs 39 is embodied as a bead extending in the radial direction along a portion of supporting tabs 39 and may be created by deformation. In an assembled state of double clutch 10, the nine attachment elements 35, on which wire load ring 34 for pre-loading second actuating element 30 is arranged radially on the outside, are attached to supporting tabs 39. A sectional view along line A-A of lever spring tab 32 is shown in FIG. 3b with lever spring tabs 32 rising in the axial direction.

Figure 4A:
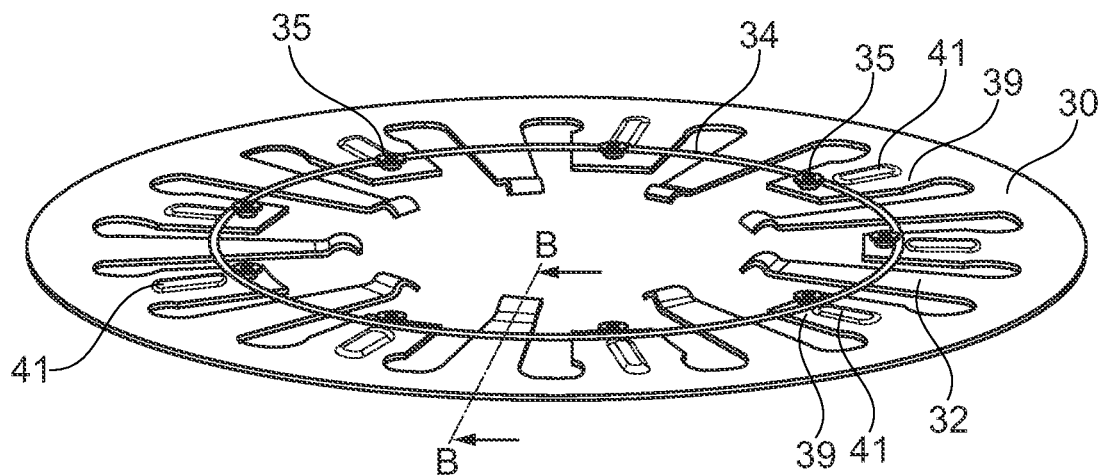
FIG. 4a is a perspective view of the second actuating element shown in FIG. 3a with an assembled wire load ring.
Figure 4B:
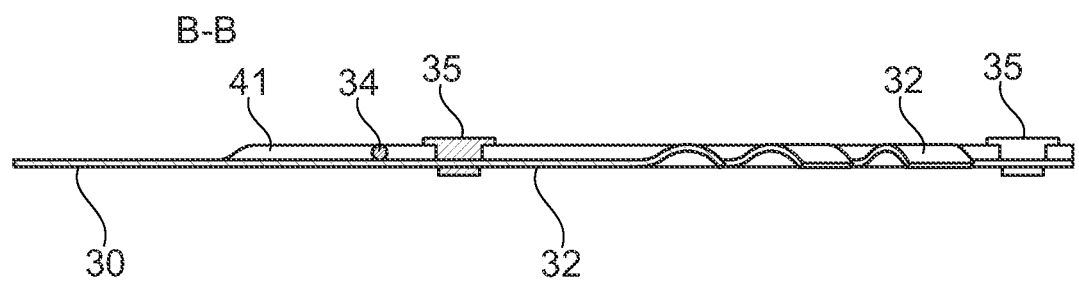
FIG. 4b is a cross-sectional view of a pre-loaded second actuating element.

FIG. 4a shows the second actuating element in an assembled condition. Wire load ring 34 is attached to supporting tabs 39 by means of attachment elements 35, causing lever spring tabs 32 to be elastically moved into the same plane as supporting tabs 39 and thus to be pre-loaded. A sectional view along line B-B of lever spring tab 32 is shown in FIG. 4b.

Figure 5:
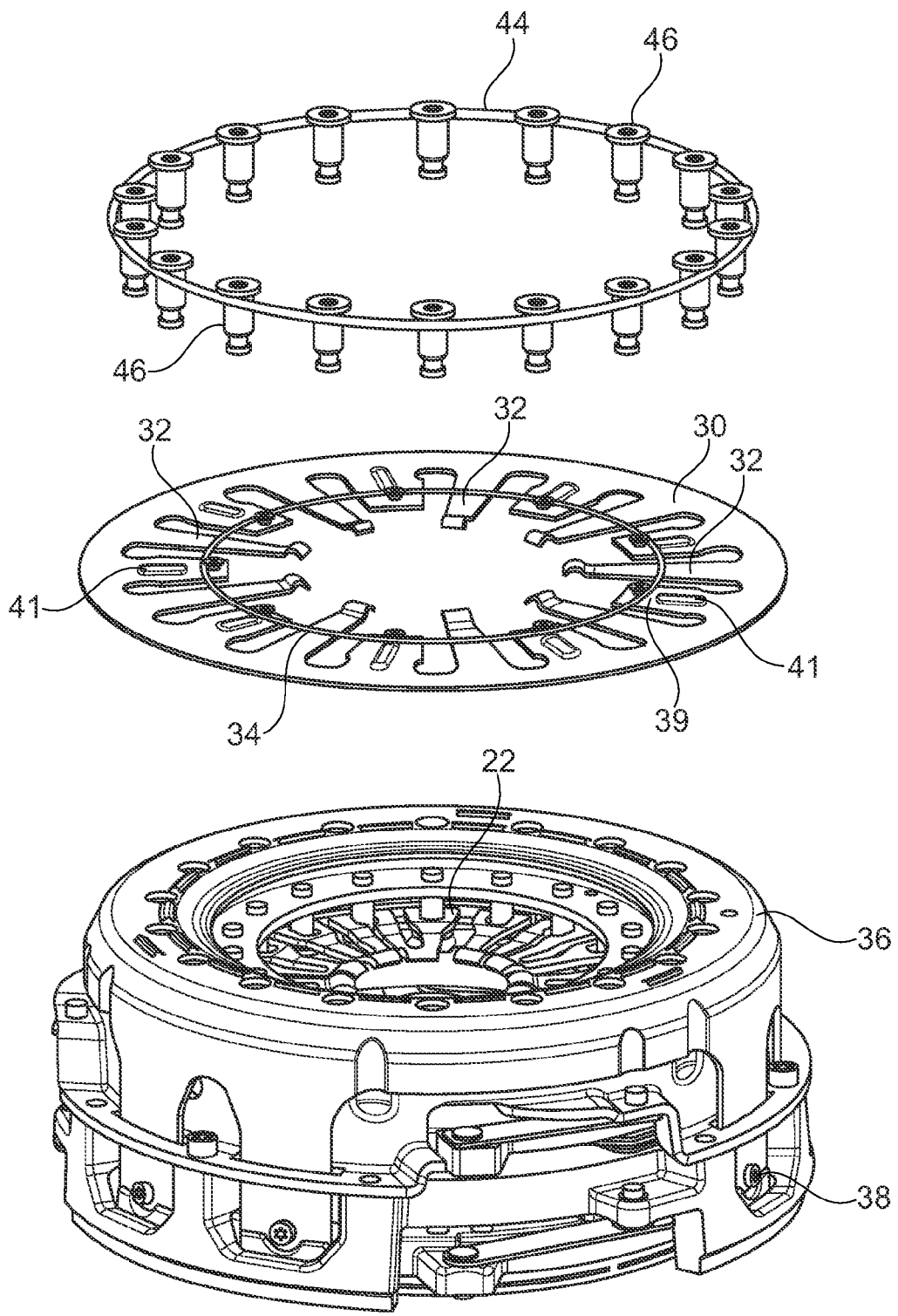
FIG. 5 is a partially exploded view of a pressure ring with a pre-loaded second actuating element and an attachment bolt with a wire support ring; and, FIG. 6 is a diagram representing the characteristic lines of a clamping force and an engaging force.

FIG. 5 shows pressure ring 36 with the rest of double clutch 10 and with a spaced-apart, pre-mounted and pre-loaded second actuating element 30. Wire support ring 44 with the required bolts 46 for attachment to clutch cover 42 of first friction clutch 12 is shown at a distance from pressure ring 36 and the pre-loaded second actuating element 30.

Figure 6:
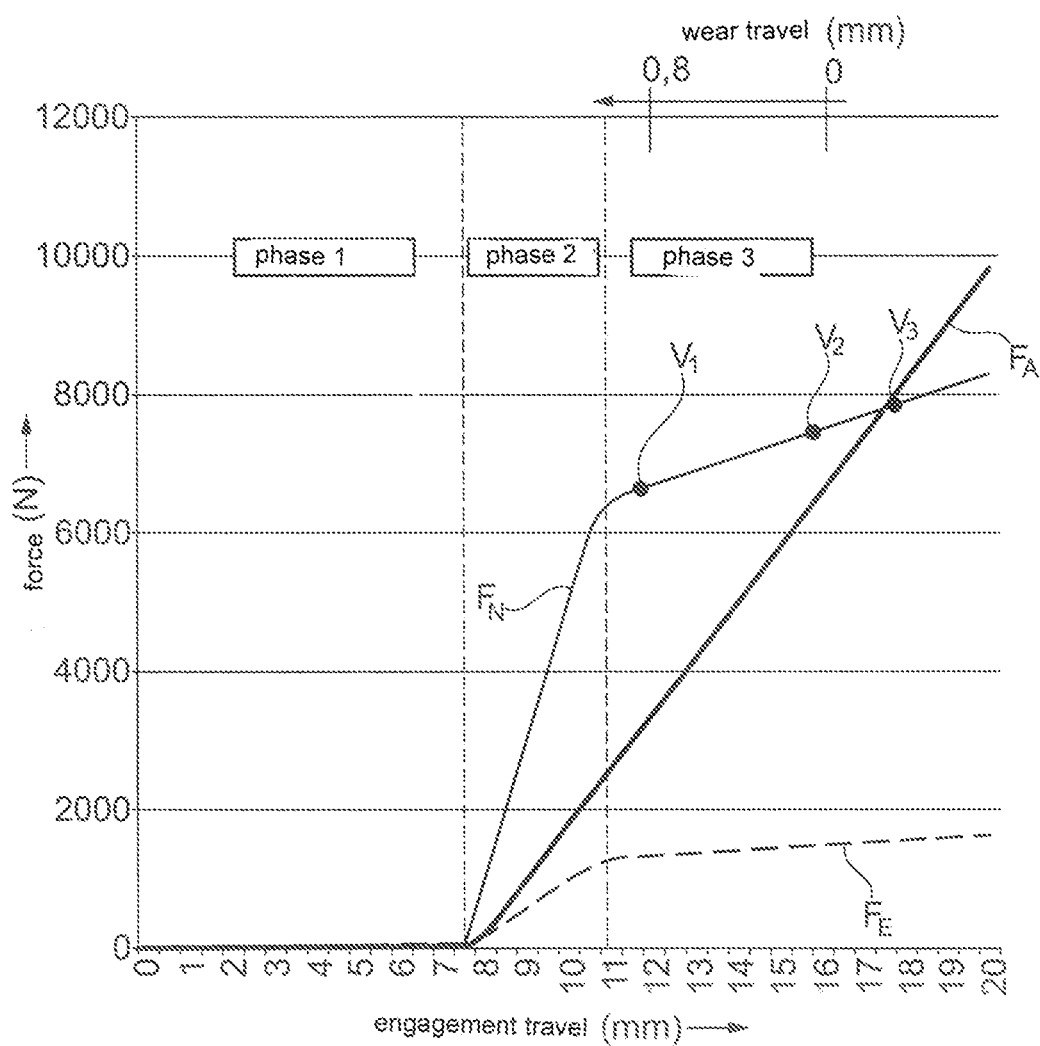

FIG. 6 is a diagram showing pressing force FN of second friction clutch 14 of double clutch 10 of the invention compared to pressing force FA of a conventional double clutch and engaging force FE required to engage second friction clutch 14. The process for engaging second friction clutch 14 may be represented in three phases.

In a first phase, engaging force FE acts radially on the inside on the pre-loaded second actuating element 30 with wire load ring 34, in particular on lever spring tabs 32. In the first phase, the clearance between second pressure plate 26 and second clutch disc 24 is overcome by a displacement of second pressure plate 26. The clearance may be 1.3 mm, for example. Due to the clearance, no pressing force FN or FA is generated in the first phase, and radially to the outside, the pre-loaded second actuating element 30 tilts about wire support ring 44, which forms the fulcrum of second actuating element 30. Once the clearance between second pressure plate 26 and second clutch disc 24 is closed, the second phase of the engagement process begins.

In the second phase, second pressure plate 26 presses second clutch disc 24 against second counter-plate 28, which may be embodied as a flywheel, for example. Due to the design in particular of the rigidities, of the pre-loaded second actuating element 30, in particular of lever spring tabs 32 and supporting tabs 39 in combination with wire load ring 34, engaging force FE acting on pressure ring 36 is transmitted. As long as engaging force FE is smaller than the pre-loading force of the pre-loaded second actuating element 30, lever spring tabs 32 remain loaded against wire load ring 34. A deformation of lever spring tabs 32 occurs in the radially inward free end of lever spring tabs 32 as a result of the high rigidity and the short lever arm, allowing pressing force FN to rise steeply and essentially linearly in the second phase while engaging force FE rises essentially linearly.

The third phase of the engagement process starts essentially at a point when engaging force FE exceeds the pre-loading force of the pre-loaded second actuating element 30. From this point on, as the engagement process continues, the entire second actuating element 30, in particular all lever spring tabs 32, is elastically deformed. The elastic deformation occurs essentially in the radially outward region of second actuating element 30, in particular of lever spring tabs 32, because of the lower rigidity and the longer lever arm. As the pre-loaded second actuating element 30 and in particular lever spring tabs 32 incorporate two rigidities, a high rigidity at the onset of the engagement process may be combined with a lower rigidity in the engaged condition. Thus, in comparison with the second phase, in the third phase, which is the engagement region relevant for operation, a smaller linear gradient of pressing force FN is possible as the engagement travel increases.

At the transition from the second phase to the third phase, the curve of pressing force FN flattens considerably due to the integrated two rigidities. The engagement travel relevant during reliable operation of second friction clutch 14 is composed of the stroke difference between the maximum and the minimum engagement travel, V3 to V2, and the occurring wear V2 to V1, V2 representing no wear and V1 representing the maximum wear of 0.8 mm, for example. Across the relevant engagement travel in the third phase, a pressing force FN that has a very small linear gradient may be ensured. After an essentially linear rise in the second phase, in the third phase, engaging force FE required to actuate second friction clutch 14 essentially has a very small gradient that is approximately constant across the relevant engagement travel from V3 via V2 to V1. By way of comparison of pressing force FN of double clutch 10 according to the invention, the diagram also shows pressing force FA of a conventional double clutch, which progresses essentially linearly in the third phase, resulting in a considerably reduced pressing force FA in the case of wear, i.e. between V2 and V1.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS

10 Double clutch
12 First friction clutch
14 Second friction clutch
16 First clutch disc
18 First pressure plate
20 First counter-plate
22 First actuating element
24 Second clutch disc
26 Second pressure plate
28 Second counter-plate
30 Second actuating element
32 Lever spring tab
34 Wire load ring
35 Attachment element
36 Pressure ring
37 Bulge
38 Screw connection
39 Supporting tabs
40 Groove
41 Profile
42 Clutch cover
44 Wire support ring
46 Bolt
FN Pressing force
FE Engaging force
FA Pressing force
V1 End of wear region
V2 Beginning of wear region, minimum engagement travel
V3 Maximum engagement travel

What is claimed is:

1. A double clutch for coupling a drive shaft of a vehicle motor to a transmission shaft of a vehicle transmission and/or to an accessory power-take-off of the motor vehicle, in particular to a power take-off shaft, comprising:
a first friction clutch for frictionally clamping a first clutch disc couplable to the transmission shaft between a first pressure plate and a first counter-plate, the first pressure plate displaceable in an axial direction to close the first friction clutch, wherein the first friction clutch is at least partially enclosed by a clutch cover;
a second friction clutch for frictionally clamping a second clutch disc couplable to the accessory power take-off between a second pressure plate and a second counter-plate, the second pressure plate displaceable in the axial direction to close the second friction clutch;
a first actuating element configured to displace the first pressure plate; and,
a second actuating element configured to engage a pressure ring connected to the second pressure plate to displace the second pressure plate, wherein the pressure ring surrounds the first friction clutch essentially on the outside and at least partially passes through the clutch cover, the pressure ring having a cylindrical wall portion that directly abuts against the second pressure plate;
wherein the second actuating element is pre-loaded by at least one wire load ring.

2. The double clutch as recited in claim 1, wherein the second actuating element is a lever spring with lever spring tabs extending in a radially inward direction, and wherein the wire load ring is arranged on the lever spring tabs.

3. The double clutch as recited in claim 2, wherein the lever spring has supporting tabs for supporting the wire load ring.

4. The double clutch as recited in claim 3, wherein the lever spring tabs and the supporting tabs are arranged in an alternating way.

5. The double clutch as recited in claim 3, wherein the supporting tabs have attachment elements for attaching the wire load ring to the supporting tabs.

6. The double clutch as recited in claim 3, wherein the supporting tabs are shorter than the lever spring tabs in the radially inward direction.

7. The double clutch as recited in claim 3, wherein at least parts of the supporting tabs have a profile.

8. The double clutch as recited in claim 7, wherein the profile is in a form of a bead.

9. A drive train for a motor vehicle, comprising:
a motor having a drive shaft;
a transmission having a transmission shaft; and,
a double clutch coupling the drive shaft to the transmission shaft and/or to an accessory power-take-off of the motor vehicle, the double clutch comprising:
a first friction clutch for frictionally clamping a first clutch disc couplable to the transmission shaft between a first pressure plate and a first counter-plate, the first pressure plate displaceable in an axial direction to close the first friction clutch, wherein the first friction clutch is at least partially enclosed by a clutch cover;
a second friction clutch for frictionally clamping a second clutch disc couplable to the accessory power take-off between a second pressure plate and a second counter-plate, the second pressure plate displaceable in the axial direction to close the second friction clutch;
a first actuating element configured to displace the first pressure plate; and,
a second actuating element configured to engage a pressure ring connected to the second pressure plate to displace the second pressure plate, wherein the pressure ring surrounds the first friction clutch essentially on the outside and at least partially passes through the clutch cover, the pressure ring having a cylindrical wall portion that directly abuts against the second pressure plate;
wherein the second actuating element is pre-loaded by at least one wire load ring.

10. The drive train as recited in claim 9, wherein the accessory power-take-off is a power take-off shaft.

11. A double clutch for coupling a drive shaft of a vehicle motor to a transmission shaft of a vehicle transmission and/or to an accessory power-take-off of the motor vehicle, in particular to a power take-off shaft, comprising:
- a first friction clutch for frictionally clamping a first clutch disc couplable to the transmission shaft between a first pressure plate and a first counter-plate, the first pressure plate displaceable in an axial direction to close the first friction clutch, wherein the first friction clutch is at least partially enclosed by a clutch cover;
- a second friction clutch for frictionally clamping a second clutch disc couplable to the accessory power take-off between a second pressure plate and a second counter-plate, the second pressure plate displaceable in the axial direction to close the second friction clutch;
- a first actuating element configured to displace the first pressure plate; and,
- a second actuating element configured to engage a pressure ring connected to the second pressure plate to displace the second pressure plate, wherein the pressure ring surrounds the first friction clutch essentially on the outside and at least partially passes through the clutch cover, the pressure ring having a cylindrical wall portion that directly engages a groove arranged on the second pressure plate;
- wherein the second actuating element is pre-loaded by at least one wire load ring.

* * * * *